United States Patent [19] [11] Patent Number: 4,646,229
Boyle [45] Date of Patent: Feb. 24, 1987

[54] TIME-ORDERED DATA BASE

[75] Inventor: Gerald C. Boyle, Piscataway, N.J.

[73] Assignee: AT&T Bell Laboratories, Murray Hill, N.J.

[21] Appl. No.: 441,731

[22] Filed: Nov. 15, 1982

[51] Int. Cl.$^4$ ............................................. G06F 15/40
[52] U.S. Cl. ..................................... 364/200; 364/300
[58] Field of Search ................ 364/200 MS, 300 MS, 364/900 MS, 407; 340/825, 28

[56] References Cited

U.S. PATENT DOCUMENTS

| | | | |
|---|---|---|---|
| 2,542,890 | 2/1951 | Basu et al. | 364/407 |
| 4,007,450 | 2/1977 | Haibt et al. | 364/200 |
| 4,121,196 | 10/1978 | Johnson et al. | 364/900 |
| 4,274,139 | 6/1981 | Hodgkinson et al. | 364/200 |
| 4,320,451 | 3/1982 | Bachman et al. | 364/200 |
| 4,344,134 | 8/1982 | Barnes | 364/200 |
| 4,412,285 | 10/1983 | Neches et al. | 364/200 |
| 4,432,057 | 2/1984 | Daniell et al. | 364/200 |
| 4,435,753 | 3/1984 | Rizzi | 364/200 |
| 4,468,732 | 8/1984 | Raver | 364/200 |
| 4,479,196 | 10/1984 | Ferrer et al. | 364/900 |

OTHER PUBLICATIONS

Standard Dictionary of Computers and Information Processing, (2nd Ed.), Martin H. Weik, Hayden Book Co. (New Jersey), p. 38.
Dictionary of Computers, Data Processing, and Telecommunications, (John Wiley & Sons), Jerry M. Rosenborg, PhD., p. 120.
The Bell System Technical Journal, vol. 61, No. 9, Nov. 1982, "A Directed Hypergraph Database: A Model for the Local Loop Telephone Plant", by A. J. Goldstein, pp. 2529-2555.
ACM Transactions on Database Systems, vol. 4, No. 1, Mar. 1979, "A Majority Consensus Approach to Concurrent Control for Multiple Copy Databases", R. H. Thomas; pp. 180-209.
NTC '77 Conference Record, vol. 2, 5-7 Dec. 1977, "Automated Application Engineering of a Large Tall Telephone Switching System", by Williams et al., pp. 24:5-1-24:5-5.

Primary Examiner—James D. Thomas
Assistant Examiner—William G. Niessen
Attorney, Agent, or Firm—Robert O. Nimtz

[57] ABSTRACT

A data base system includes future versions of the data base which are maintained currently in response to orders for future execution. All transactions against the data base are time stamped to assure access to the proper version of the data base. Information concerning the various versions are stored as delta nodes or lists. The application of this data base system to the assignment of outside plant telephone facilities to telephone subscribers is also described.

10 Claims, 12 Drawing Figures

RECORD-PAIR 0101·121

(a) BODY
1) TYPE PAIR
2) ID 388
3) RMK F2 PAIR
4) EI NO
5) LK 453

(b) EDGE
1) TYPE I CABLE
2) ID1 433
3) RITN DELETOR (c) EDGE
1) TYPE I PAIR
2) ID1 391
3) TYPE 2 TERMINAL
4) ID2 211
5) PATH CENT. OFF.

(d) EDGE
1) TYPE I TERMINAL
2) ID1 211
3) BUDPST
4) SIDE OUT (e) EDGE
1) TYPE I TERMINAL
2) ID1 642
3) COLOR BLUE-GREEN
4) SIDE IN (f) EDGE
1) TYPE I TERMINAL
2) ID1 642
3) TYPE 2 IU
4) TD2 105
5) PATH FIELD (g) EDGE
1) TYPE I NAME
2) ID1 326
3) EXID 101·121

(h) EDGE
1) TYPE I LOOP
2) ID1 232

PENDING DATA BASE USING DELTA NODES

DELTA NODE (a) BODY
    1) TYPE    DELTA
    2) ID      120

(b) EDGE
    1) TYPE 1    DELTA
    2) ID 1      122
    3) PENDING  BEFORE-DELTA (c) EDGE
    1) TYPE 1    DELTA
    2) ID 1      135
    3) PENDING  AFTER-DELTA (d) EDGE
    1) TYPE 1    PAIR
    2) ID 1      125
    3) TYPE 2    PAIR
    4) ID 2      129
    5) PENDING  BEFORE-AFTER-VERSIONS (e) EDGE
    1) TYPE 1    CKT
    2) ID 1      126
    3) TYPE 2    CKT
    4) ID 2      130
    5) PENDING  BEFORE-AFTER-VERSIONS (f) EDGE
    1) TYPE 1    TRANSACTION
    2) ID 1      127

PENDING DATA BASE USING HISTORY TREES AND TRANSACTION SETS

TIME-ORDERED DATA BASE

CROSS REFERENCE TO RELATED APPLICATIONS

The following U.S. applications, assigned to applicant's assignee and filed concurrently herewith, include related subject matter:

(1) "Hyperedge Entity-Relationship Data Base Systems", Ser. No. 441,730, filed Nov. 15, 1982, since matured into U.S. Pat. No. 4,479,196 on Oct. 23, 1984;
(2) "Stored Program Controller", Ser. No. 399,175, filed July 16, 1982 now U.S. Pat. No. 4,628,158; and
(3) "Dynamic Data Base Representation", Ser. No. 441,733, filed Nov. 15, 1982, now abandoned.

TECHNICAL FIELD

This invention relates to data bases and, more particularly, to a data base with information having significant time dependencies.

BACKGROUND OF THE INVENTION

It is well-known to use digital storage facilities and a programmed computer to provide, respectively, a data base storage medium and a data base manager. The storage facilities serve to store large amounts of information in digital form while the data base manager is a computer program facility for accessing, searching and changing the information in the data base.

Such data base systems are often used to provide an inventory of physical facilities available to a community of users. The facilities may, for example, from time to time be assigned for exclusive use by one of the users to the exclusion of others. A system for airline seat reservations, automobile rental reservations or computer center resource allocation are illustrative of the types of data base systems involving the temporary assignment of facilities to users.

When facilities are temporarily assigned to one user and later are reassigned to another user, the assignment and reassignment of those facilities can react to the instantaneous demand of users for facilities, or can be scheduled out into the future by assignment algorithms which optimize the use of the facilities in some way. In the latter case, it is necessary not only to keep track of the current assignments of facilities to users, but also to keep track of future reassignments of those same facilities to different users.

The general problem of representing future versions of a data base as well as the current version is a complicated problem. Complexity is compounded when processing must be done with such future versions as well as with the current version.

SUMMARY OF THE INVENTION

In accordance with the illustrative embodiment of the present invention, methods and apparatus are provided to create, maintain, and use a data base structure and data base management tools for time-ordered or time-dependent data items. More specifically, all of the information required to represent the data base contents at desired future points in time is maintained in the data base. Queries into the data base are time-stamped to limit the access to the proper time-dependent version of the data base.

A particular advantage of the present invention is the ability to deal with the state of the data base as it will be at some future time, rather than simply as the data base is at the present time. Assigning facilities, for example, can be optimized for the resources available in the future when the need arises, rather than at the present time.

DETAILED DESCRIPTION

Figure 1:
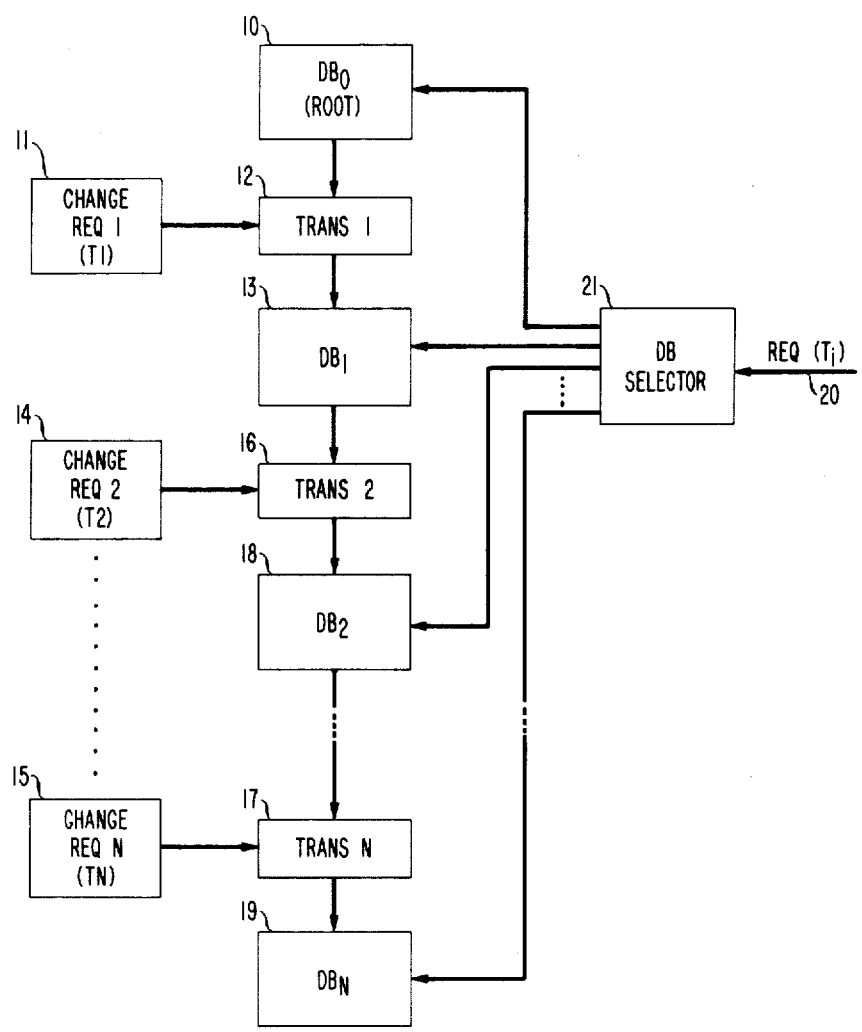
FIG. 1 is a generalized schematic representation of a time-dependent data base system in accordance with the present invention.

Referring more particularly to FIG. 1, there is shown a generalized schematic representation of a data base which is time-dependent. Box 10, for example, represents a data base at a present time, $T_0$, containing all of the data items and all of the data interrelationships necessary to represent the current state of the physical entities represented in the data base. As a result of a change request 11, to take place at a future time, $T_1$, transaction 12 operates on data base 10 to produce data base 13. Data base 13 represents the physical world as it is expected to exist at time $T_1$, but the data base itself can be created at any time after $T_o$ (up to time $T_1$) to permit sound planning of the actual changes in the physical world. A "transaction" is merely a set of operations which take the data base from one self-consistent state to another self-consistent state. A data base for assigning physical facilities to particular users, for example, can be used to plan a future assignment by locating available facilities through the then current data base version and creating a new version of the data base representing the physical facilities after they have been assigned, but available before the physical assignment actually takes place.

The value of this data base representation of future physical events lies in permitting yet further change requests 14 . . . 15, to be similarly planned currently, using respective transactions 16 . . . 17, to operate on data bases 13 ... 18 which accurately represent the data base at the time the physical facilities must be changed. In facility assignment systems, for example, the facilities available for reassignment, i.e., the idle facilities, are those facilities idle and available at the time the future assignment is to be made, and not those idle and available at the present time.

Similarly, requests for data from the data base, schematically represented by line 20, must be accompanied by a time stamp ($T_i$) to indicate which version of the data base is to be read. A data base selector 21 uses this time stamp to provide access only to the data base version bearing the appropriate time stamp.

It is not, of course, necessary to replicate the entire data base for each of versions 10, 13, 18, ... 19 of the data base. In the preferred embodiment, it is only necessary to provide updated versions of those portions of the data base which are changed by the change orders 11, 14 ... 15, respectively. Selector 21 then merely has to ascertain if a query is directed toward an unchanged record or toward one of the changed records, and which version of the changed record.

In order to better understand the use of time-dependent data bases, a particular application of these principles will be discussed. More specifically, a particular data base and particular data base application will be described in detail so that the time-dependent data base representation can be more readily understood.

Figure 2:
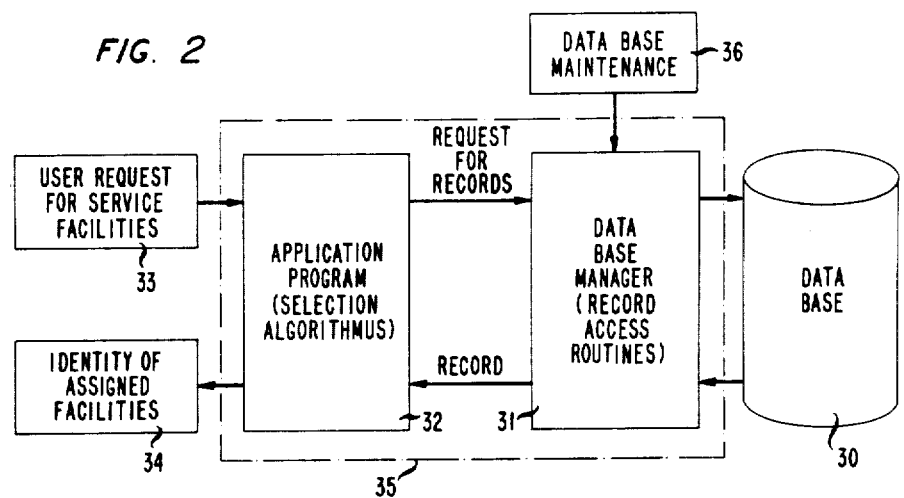
FIG. 2 is a block diagram of one application of a data base for the assignment of facilities to users of those facilities.

Referring more particularly to FIG. 2, there is shown a general block diagram of a particular data base application. The information processing system of FIG. 2 comprises a data base 30, illustrated as being contained on a magnetic disc-pack, a data base manager 31, a group of application programs 32, an input device 33 and an output device 34. The data base manager 31 and the application programs 32 are both computer programs, written in source code by programmers, compiled into object code by a compiler program (not shown) and loaded into the internal memory of a general purpose data processor 35.

The input device 33 provides a request to the application programs 32 for service requiring information in the data base 30. Application programs 32 decide what information is required to fill the service request, format a request for specific records and then forward that request to the data base manager 31. The data base manager 31 retrieves and stores records without regard to the overall data base architecture.

The record access routines of data base manager 31 retrieve the desired information from data base 30 and pass the information as values back to application programs 32. These values will then be reformatted by application programs 32 to provide the particular service requested by input device 33. The result will be forwarded to output device 34.

While device 33 may be a keyboard and device 34 a display screen in an integral terminal operated by a human user, device 33 may just as well by an automatic electronic or mechanical device (e.g., a parts counter in an assembly line) and device 34 may likewise be an automatic device (e.g., a purchase order generator to reorder inventory parts when levels fall too low). Thus the system of FIG. 2 is a service-providing system rather than simply an information-providing system. The service (inventory control, facilities assignments, ticket preparation, etc.) requires the availability of the information in data base 30, but goes beyond that information to provide a basis for service of some type in the outside world.

The data base 30 is created and maintained by data base maintenance facility 36. Facility 36 also uses the data base manager 31 to access data base 30, but in this case to create and update the records in data base 30. This activity is necessary to the present invention where a plurality of time-dependent versions of the data base must be stored simultaneously.

Having explained the present invention in a generalized way in connection with FIG. 1 and a generalized data base in connection with FIG. 2, the balance of the figures will be used to explain in detail a particular application of the data base representation and the use of the present invention in connection therewith. This application is the assignment of physical facilities (wires, cables, terminal boxes, etc.) to a telephone subscriber in order to connect that subscriber's telephone to the local telephone central office. While such assignments are maintained for a relatively long period of time, customers do move and facilities must be reassigned. In central offices serving tens of thousands of customers, such reassignments of facilities constitute a major, labor-intensive activity. Maximizing the efficiency and minimizing the cost of such reassignments has therefore become an important telephone company activity.

Figure 3:
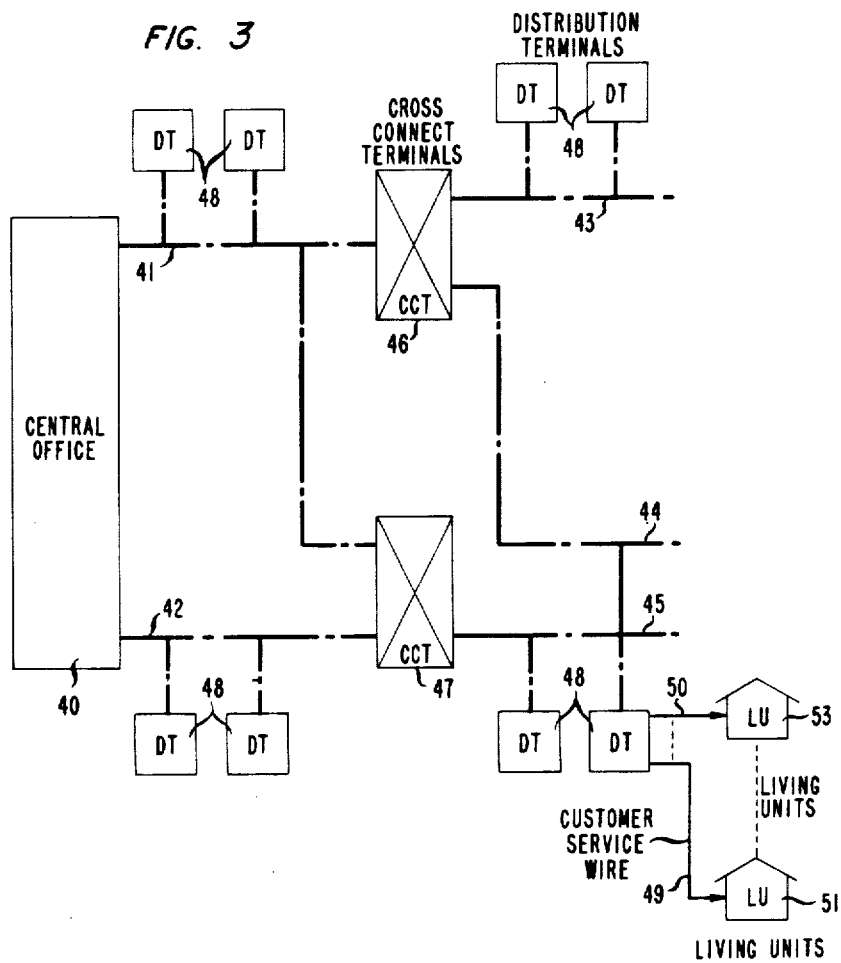
FIG. 3 is a generalized block diagram of the telephone outside plant facilities used in providing telephone service.

Referring then to FIG. 3, there is shown a schematic diagram of typical facilities used to connect a telephone subscriber to the local central office. Since these facilities are all outside of the central office 40, they have been termed "outside plant" facilities. Such outside plant facilities consist of multiconductor cables such as cables 41 through 45, each of which includes a large number of twisted pairs of copper wires. In general, one such pair is used to provide telephone service to one customer. Cables are identified as to their proximity to the central office 40, e.g., f1 cables 41 and 42 and f2 cables 43, 44 and 45, separated by cross-connect terminals 46 and 47. Some areas require three or more levels of cable (f3, f4, etc.) in the outside plant interconnection system.

Cross-connect terminals 44 and 47 are devices for connecting electrical wire pairs to each other. They have one set of binding posts for connecting wire pairs from the central office side (the IN side) and another set for connecting wire pairs from the other (field) side (the OUT side). In addition, cross-connect terminals have jumper wires selectively interconnecting selected IN pairs with selected OUT pairs, thereby effectuating the physical interconnection between distribution cable pairs and feeder cable pairs. Cables and pairs have central office ends and field ends.

At selected points along cables 41 through 45 are distribution terminals 48. These distribution terminals also have binding posts for connecting cable pairs to customer service wires such as drop wires 49 and 50 connected to customer living units 51 and 52, respectively. Distribution terminals are typically located at concentrations of subscriber living units and can be located on telephone poles, in pedestals or on customers' premises.

The assignment problem in providing telephone service to the living unit of a telephone subscriber is to assign, in the data base, the necessary wires, terminals, binding posts and customer service wires to create a complete and continuous electrical circuit (a local loop) between the customers' telephone set and the central office. Once the assignment is made in the data base, the corresponding physical connections have to be made out in the field at the time service is to be initiated. The data base must reflect both pending service orders and completed service orders. All facilities are either working or idle and assignments for new customers are generally selected from idle facilities. Since rearranging the physical facilities is a very expensive activity, most of the assignment algorithms attempt to minimize the physical rearrangement of plant facilities. For example, facilities assigned to a living unit continue to be so assigned even after a customer has moved. The assumption is that a new customer will soon move in and request service. On the other hand, after some empirically determined time (a few months), the likelihood of the living unit being reoccupied becomes very small and releasing the facilities for use elsewhere becomes the best tactic.

Figure 4:
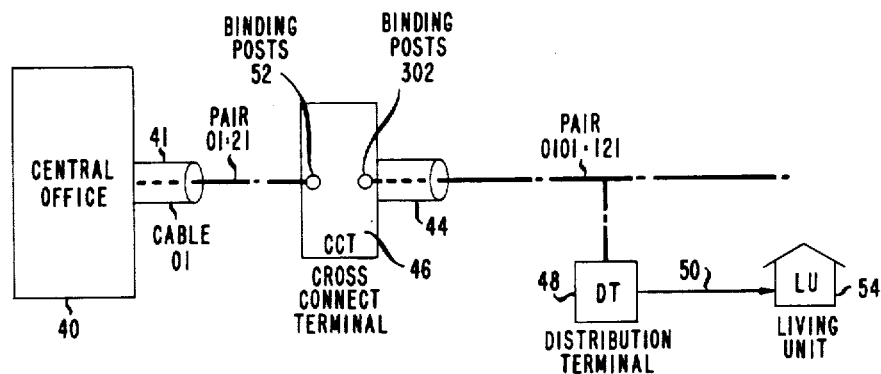
FIG. 4 is a graphical representation of typical outside plant facilities used to provide service to a particular telephone subscriber.

In FIG. 4 there is shown the specific facilities assigned to provide telephone service to living unit 52 in FIG. 3. Thus, cable 41 connecting central office 40 with cross-connect terminal 46 is identified as cable "01." The specific pair in cable 01 assigned to living unit 52 is pair "21", best represented by the cable-pair dyad "01:21." The field end of pair 01:21 is connected to binding posts 52 on the IN side of terminal 46. The IN binding posts 52 are cross-connected by wire jumpers to OUT binding posts 302. The central office end of the 121st pair of cable 44 (pair 0101:121) is connected to binding posts 302 in terminal 46. At the other (field) end, the pair 0101:121 is connected through distribution terminal 48 to drop wire 50 and thence to living unit 52.

It will be noted that each facility used for this loop has both a type (pair, cable, terminal, etc.) and an identification (pair 01:21, terminal 46, binding posts 302, etc.). The general problem is to create a data base which serves as an inventory of the facilities and simultaneously facilitates the assignment and reassignment of those facilities into service-providing loops between customers and the central office.

Figure 5:
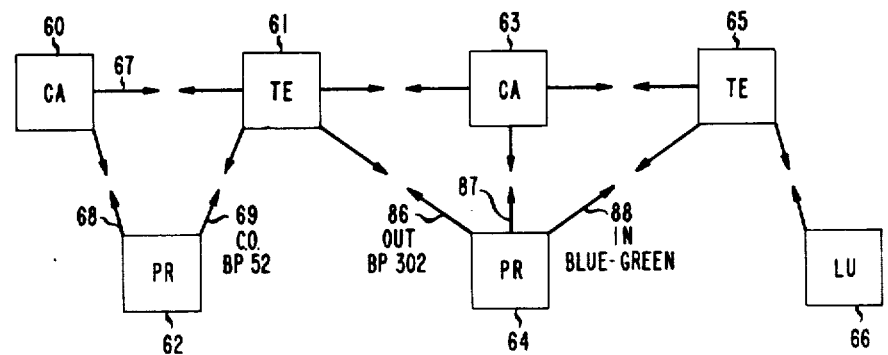
FIG. 5 is a directed graph representation of an inventory of the facilities shown in FIG. 4.

In FIG. 5 there is shown a standard prior art directed graph representing the inventory of facilities making up the outside plant facilities illustrated graphically in FIG. 4. Each box in FIG. 5 is a vertex of the graph and one vertex is provided for each physical entity in the inventory. Thus box 60 is a graph vertex representing cable 41, vertex 61 represents cross-connect terminal 46, vertex 62 represents pair 01;21, vertex 63 represents cable 44, vertex 64 represents pair 0101:121, vertex 65 represents distribution terminal 48 and vertex 66 represents living unit 52. These vertices are the entities in an entity-relationship data base.

The relationships between these entities are represented in FIG. 5 by the directed arrows (edges) between the vertices. Thus, arrow 67 represents the relationshp "connected to" since cable 41 is connected to terminal 46. Arrow 68 represents the relationship "included in" since pair 01:21 is included in cable 41. Finally, the arrow 69 represents the relationship "connected to" and carries further information identifying the binding posts ("CO BP 52"), i.e., binding posts 52 on the central office (IN) side of terminal 46. The other directed arrows in FIG. 5 have analogous meanings and will not be further discussed here, except to note that the distribution terminal 48 and the living unit 52 have "served by" and "serves" interrelationships and the customer service wire 50 has been left out for simplicity.

Figure 6:
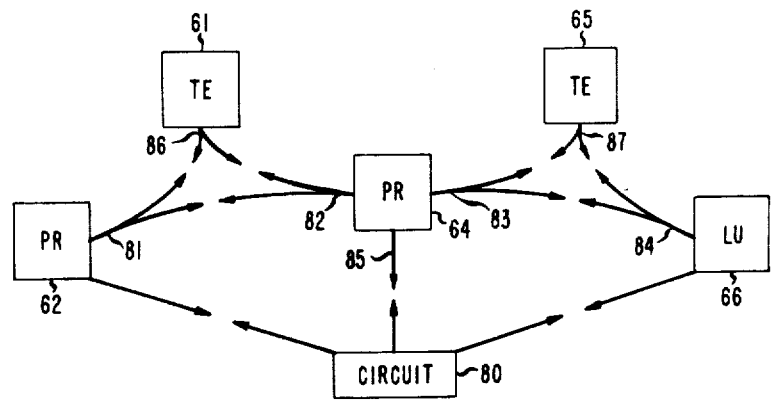
FIG. 6 is a hypergraph representation of the connectivity of the facilities shown in FIG. 4.

The inventory information contained in FIG. 5 is necessary to keep track of the physical facilities used in the loop plant. It is not particularly convenient, however, in assigning an electrical circuit (a loop) to a customer. In FIG. 6 there is shown another set of arrows (edges) between these same vertices that better serve the loop assignment need.

In FIG. 6, the same vertices shown in FIG. 5 are repeated (except for the cable vertices) and a circuit vertex 80 has been added. The graph of FIG. 6 can be said to represent the connectivity of the communication circuit as distinguished from the inventory of the parts (FIG. 5). The circuit (named with a telephone number in vertex 80) is composed of three parts: pair 01:21, pair 0101:121 and living unit 52 (along with drop wire 50). These three parts are connected to each other through terminals. For efficiency of assignment processing, it is desirable to know directly that pair 01:21 is connected to pair 0101:121. At the same time, it is necessary to know that these interconnections take place in terminals and at specific binding posts. The hyperedges 81 and 82 are used to simultaneously point to the connected pair and to the terminal through which this connection is effected. The representation of FIG. 5 in which the pair-to-pair connection could be discovered by further searching in the data base is very inefficient for assigning facilities.

The interconnections of pair 0101:121 (box 64) and living unit 52 (box 66) is likewise represented by two hyperedges 83 and 84, serving the same function for this part of the circuit. It should be noted that a rearrangement of the jumper wires could be used to reassign the physical facilities to other circuits without changing the inventory. That is, the connectivity of FIG. 6 could change without changing the inventory of FIG. 5.

The hypergraph of FIG. 6 serves to maintain an inventory of assigned electrical circuits while that of FIG. 5 maintains an inventory of physical parts. Both are necessary to adequately service the telephone subscribers.

Figures 7, 8:
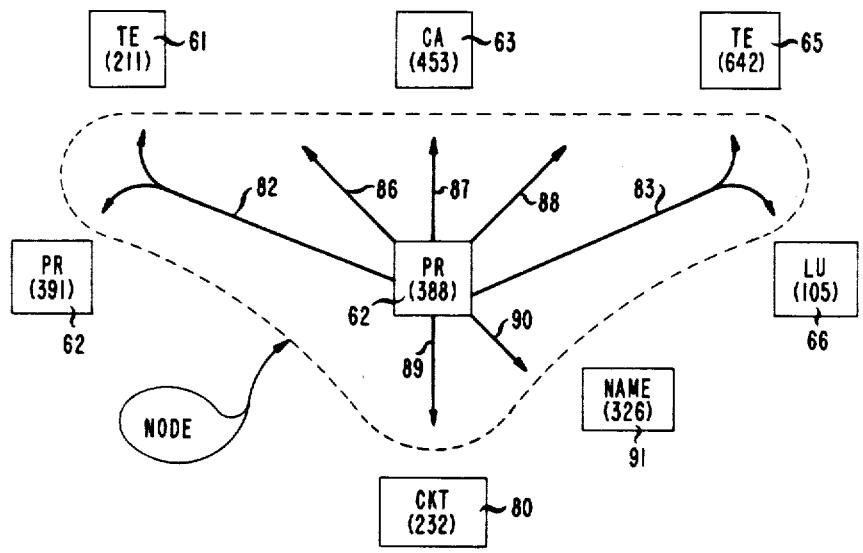
FIG. 7 is a complete graphical representation of one node of the hypergraph of FIG. 6.
FIG. 8 is a typical data base record for the node of FIG. 7, illustrating the hyperedge representation.

In FIG. 7 there is shown a graphical representation of one record of the hypergraph data base used to represent both the physical facilities and the circuit assignment illustrated in FIG. 3. The record represented in FIG. 7 is that representing pair 101:121. The record includes a body portion (box 62) and a plurality of edge portions 82,83,86,87,88 and 89, some of which (82 and 83) are hyperedges. The record illustrated in FIG. 7 contains all of the information about pair 0101:121 that is in the data base. It will be noted that the "name" of this pair by which it is known in the outside world (pair 101:121) is a separate entity 91 pointed to by edge 90. The internal identification of each record is by way of an internal number which permits direct access to the associated record. Moreover, the external name of an entity can change without changing all of the internal references thereto.

In FIG. 8 there is shown an alphanumeric representation of the record in the data base for pair 0101:121. The body portion of the record appears first, but the edges are ordered haphazardly. A specific edge must be searched for in this arrangement. Alternatively, the edges could be ordered in a preselected sequence and accessed directly. The contents of the data record of FIG. 8 will now be discussed.

It will be first noted that each physical facility is identified with an internal identification number different from the name by which it is known in the external world. These internal identification numbers are unique to the identified record, thus simplifying the computer record-keeping, and permitting arbitrary and changeable names in the outside world. A special edge 90 points to the external identification 91 ("pair 0101:121,") as shown in FIG. 7, and at lines g1–g3 in FIG. 8.

Edges at lines c1–c5 and f1–f5 are hyperedges, each including two record identifications. Each body or edge has one or more lines of so-called "application data," i.e., information useful in applying the data bae information to a problem in the outside world. For example, at line c-5, the edge is identified as pointing to binding posts on the central office side of the terminal (as distinguished from the "field" side of the terminal). At line e-3, the pair is indicated as being connected to the "blue-green" stub wires on the "IN" side of the distribution terminal (as distinguished from "OUT" side). The edge h1–h2 identifies the loop circuit of which this pair is a part.

Figure 9:
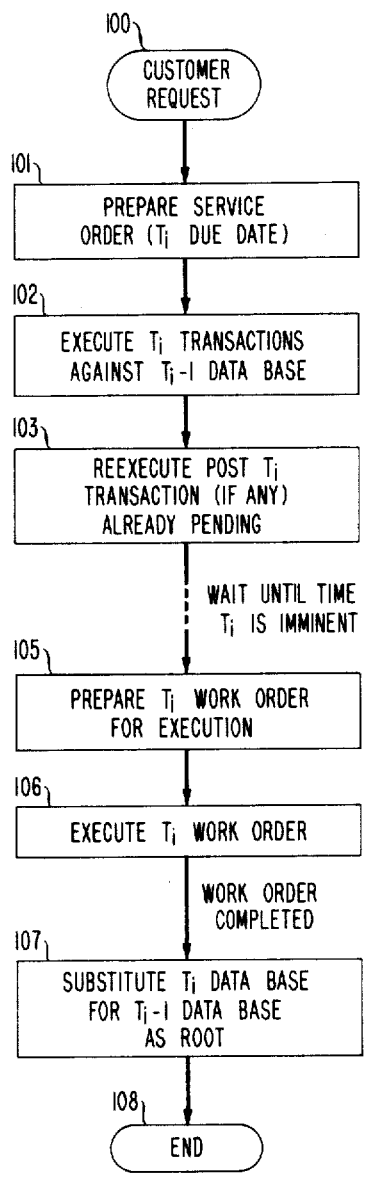
FIG. 9 is a flow chart of the service order processing procedures which utilize the pending versions of a data base.

In FIG. 9, there is shown a flow chart for the process of making time-dependent changes in a data base such as that illustrated in FIGS. 1 through 8. It is assumed that most changes are initiated by a "customer" (i.e., user of the facilities) request 100. This customer request is formalized in a service order in box 101 associated with a due date $T_i$. The service order may merely be a manually filled out paper slip or an electronic record in a separate data base. In either event, the service order contains all of the necessary information to provide the new, altered or deleted service to the customer. This includes customer identification, the date the change is to be made ($T_i$), and the precise nature of the changes in service. The change in service requires changes in the assignment of physical facilities to the customer. For example, new services require the assignment of an entire local loop to the customer, enhanced service may require more or better facilities and termination of service requires the deassignment (idling) of services previously assigned to that customer. These changes in data base assignments are summarized as a transaction against the data base, deleting, adding or substituting specific assignments of elements of the physical facilities to particular circuits and to particular customers (usually represented as a telephone number).

As can be seen in FIG. 1, the present invention contemplates the availability of a plurality of data base representations identified as to the time in the future at which the actual changes in the interconnection and assignment of the physical facilities is to take place. In box 102 in FIG. 9, the time stamp $T_i$ is used to select the version of the data base which corresponds to the state of the physical assignments at the time $T_i$. This, of course, is the version of the data base created by the transaction which took place at time $T_{i-1}$, i.e., the data base version created to correspond to the next earlier point of time.

In box 102, the transaction necessary to carry out the reassignment of facilities is executed. It will be noted that the data base version operated on (version $T_{i-1}$) does not represent the current physical assignments of the facilities, but some future state of these assignments resulting from the successive execution of transactions corresponding to time $T_1, T_2 \ldots T_{i-1}$. It will also be noted that the version of the data base at time $T_{i-1}$ corresponds precisely to the actual assignments of the physical facilities which is expected to exist at the future time $T_i$. This is vitally important since physical facilities currently available for assignment may not be available for assignment at time $T_i$ due to previous assignment (after the present time $T_o$, but before time $T_i$). Similarly, facilities not currently available may well be available at time $T_i$ due to deassignment in that interval. A simple case illustrating this is the deassignment at a future time of a local loop to a customer moving out of a living unit and the reassignment of that same loop to a new customer moving into the living unit after the old customer moves out.

It is entirely possible (indeed, likely) that other transactions have already been run against the $T_{i-1}$ data base due to previously received service orders with due dates after time $T_i$. Since the $T_i$ transactions in box 102 have changed the data base against which these post-$T_i$ transactions must be run, it is necessary to reexecute post-$T_i$ transactions against new data base versions. This is accomplished in box 103. It will be noted that all transactions which have been executed against some version of the data base, but have not yet physically taken place in the outside plant facilities, are called "pending" transactions and the data base versions after time $T_o$ are called pending versions. In FIG. 9, box 103 reexecutes all transactions still pending at time $T_i$ and which affect data base records which have changed because of the $T_i$ transaction. This, of course, changes the data base versions after time $T_i$ to accommodate the changes wrought by the $T_i$ transaction.

After the post-$T_i$ transactions are reexecuted in box 103, time is allowed to pass until the time $T_i$ is imminent. During this interval, it is entirely possible that the $T_i$ version of the data base is again changed due to the reexecution of the $T_i$ transaction resulting from some new service order with a due data preceding time $T_i$.

When the time $T_i$ is imminent, a work order is prepared in box 105. This work order actually directs and schedules the physical changes necessary to carry out the change in facilities (transaction $T_i$) required to make the physical connections of facilities correspond with the $T_i$ data base. These physical changes are executed in box 106 at time $T_i$, either manually by an outside plant crew, or automatically for facilities that can be reassigned electronically from a telephone central office location, for example, by changes in the memory of an electronics switching system or a pair gain transmission system.

When the work order has been completed, this fact is reported back to the data base maintenance facility and the $T_i$ version of the data base is substituted for the $T_{i-1}$ version of the data base in box 107. It will be noted that, by this time, the $T_{i-1}$ data base will have become the $T_o$ or root version of the data base due to the execution of all previous pre-$T_i$ work orders. Therefore, the $T_i$ version of the data has become the $T_o$ or root version of the data base. The $T_{i-1}$ version (the previous $T_o$ version) is then discarded since it it no longer needed. It can thus be seen that the root version is continually being updated as calendar time advances to overtake the sequential pending versions of the data base. The process for a particular customer request terminates in box 108 when the resulting work order is executed, but it will be appreciated that multitudes of other work orders are simultaneously in various stages of the process illustrated in FIG. 9. The use of the time stamps (due dates) permits orderly updates and reassignments of both physical facilities and creation of new pending versions of the data base.

It should be noted that some changes in the data base do not necessarily participate in the pending process illustrated in FIG. 9. Inventory changes reflecting the addition of new or substituted physical facilities, or deletions of old or nonoperative facilities, must be made immediately in the current or root version of the data base since the physical facilities themselves have actually changed. While these changes are preferably planned and hence pending in the data base, emergency changes which are unplanned must nevertheless be reflected in the data base. These are essentially $T_o$ transactions, take precedence over all pending transactions, and require the reexecution of all pending transactions to reflect the new configuration of available physical facilities.

It will be appreciated that, while it is possible to create a large number of different versions of the entire data base, as suggested in FIG. 1, it is neither efficient nor necessary to replicate the entire data base for each version. It will be noted that the transaction which transforms each version of the data base into the next successive version affects a very limited number of the data base records. It is, therefore, possible to identify all of the data base records (nodes) affected by each $T_i$ transaction, and to specify the states of thse nodes before and after the changes. If this is done systematically for all pending transactions, it is possible to use these "before" and "after" versions of the specific node data to represent the various pending versions of the data base. Those portions (nodes) of the data base which are not affected by pending transactions simply reside unaffected in the root version of the data base and are accessed as $T_i$ versions whenever a request for data or a request for reassignment occurs.

Figure 10:
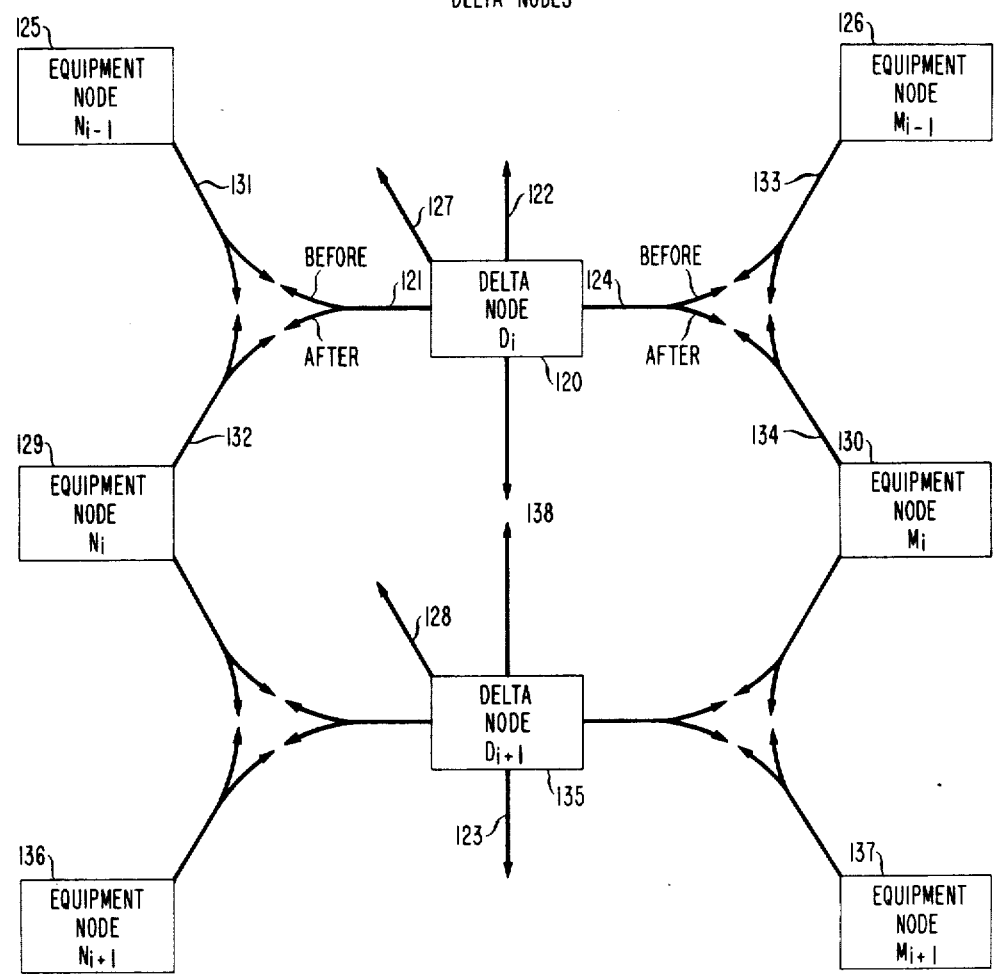
FIG. 10 is a general block diagram of an illustrative portion of the pending data base using delta nodes to record various versions of the data base.
Figures 11, 12:
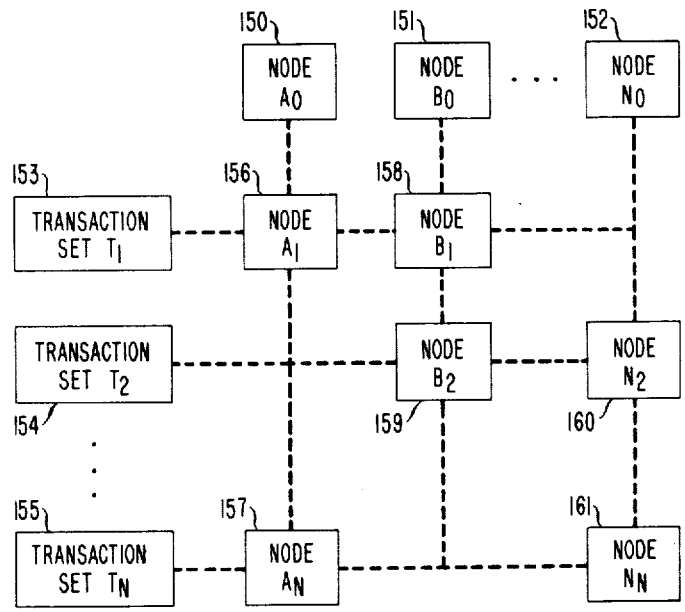
FIG. 11 illustrates the contents of one of the delta nodes of FIG. 10.
FIG. 12 is a general block diagram of the pending data base showing the use of history trees and transaction sets.

In FIGS. 10 and 12, two alternative techniques for handling the numerous pending versions of the data base will be described. These two techniques are equally efficacious in handling the pending problem, but rely on somewhat different data representations.

In FIG. 10 there is shown a particular implementation of pending data bases using co-called "delta nodes". A delta node is nothing more than a summary of the changes needed to move from one version of the affected data base nodes to the next succeeding version of the affected data base nodes and enough information to permit reexecution of the transaction if that becomes necessary. The affected nodes are replicated, one reflecting the state of the node before execution of the $T_i$ transaction and the other representing the state of the node after the execution of the $T_i$ transaction. The delta nodes include pointers (hyperedges) to both the "before" and "after" versions.

In FIG. 10, for example, $D_i$ delta node 120 (illustrated in FIG. 11), incudes an edge 127 pointing to a list of all of the $T_i$ changes. $D_i$ delta node 120 also includes hyperedges 121 . . . 124 pointing to the "before" nodes 125 . . . 126 and the "after" nodes 129 . . . 130. Thus node 129 is a replication of node 125 but including the changes wrought by the $T_i$ transaction. Similarly, node 130 is a replication of node 126 but including the $T_i$ transaction changes. For convenience, the node pairs 125-129 and 126-130, also have hyperedges 131 through 134, respectively, pointing directly to each other and to the delta node 120.

A new service order affecting these same nodes would then be represented by $D_j$ delta node 135 similar to $D_i$ delta node 120. Delta node 135, however, points to nodes 129 . . . 130 as the "before" nodes and to new further replicated and changed nodes 136 . . . 137 as the "after" nodes. The delta nodes 120 and 135 may have an edge 138 pointing to each other to facilitate the identification and reworking of the various versions of the data base.

Further delta nodes and further versions of the nodes 136 . . . 137 may also be created to accommodate yet further pending versions of the data base linked together by edges 122, 138 and 123. Indeed, the entire multiversion data base represented in FIG. 1 is contained in the sum total of all of the delta nodes and all of the replicated physical facility nodes such as those shown in FIG. 10. In order to create a new pending version, a delta node is created for the proper time $T_i$ and, by simply changing pointers, pushing the $T_{i-1}$ nodes and $T_{i+1}$ nodes apart to make room for the new $T_i$ nodes. As previously noted, the new $T_i$ transaction may cause changes requiring the reexecution of many of the post-$T_i$ transactions referenced in the post-$T_i$ delta nodes. The edges such as edges 122, 138 and 123 facilitate this type of reexecution.

The delta node approach illustrated in FIGS. 10 and 11 has the advantage of representing all pending versions of the data base in nodes structured exactly like all other data base nodes. One edge of the delta node points to the transaction list while other edges identify all of the affected nodes, both before and after the transaction. Since the delta nodes are in the same form as the physical facility nodes, the same data base primitive procedures can be used to locate, access, change, create and delete the delta nodes. This capability simplifies the data base manager since many of the same software facilities used for the rest of the data base can be used for the delta nodes.

It will be noted that many pre-$T_i$ nodes are not affected by the $T_i$ transaction. Transactions are said to be independent if the completion or cancellation of eithe one can take place without affecting the other. Thus, independent transactions need not be reworked even if they are due after the current transaction has been introduced into the data base. For convenience, edges pointing to such independent delta nodes can be included in the current delta node whenever the current transaction forces access to such an independent delta node. This "excluded delta" list greatly facilitates reworking because these nodes need not be accessed during reexecution of post-$T_i$ transactions.

The edges 122, 138 and 123 assist in maintaining the predecessor-successor relationships. This information is useful, for example, when a transaction is canceled. If that transaction has no successors, it can be canceled without any rework. On the other hand, a transaction can be completed (a work order issued) only if there are no predecessors and no conflicts due to other pending completions. Conflicts arise because alternate future views are possible due to some uncertainty as to the actual time of work completion. This happens for large changes which take a substantial amount of time to install in the field. Other alternate futures arise due to the minor reordering of work execution to accommodate convenient field crew deployment. When such conflicts are noted, they are marked as conflicts in each of the affected delta nodes and the alternative actually chosen is used to update the data base.

A "version" of the data base which is useful for carrying out a transaction need only include those nodes of the data base that are affected by the transaction. Such a version can be generated at any time by looking for the affected nodes and, if subject to previous transactions, locating the proper delta node. The delta nodes provide all of the information necessary to identify a self-consistent set of equipment node versions.

In FIG. 12, there is shown an alternative approach to the implementation of a pending data base, using so-called history trees and transation sets. As in the delta node approach, several time-dependent versions of each node of the data base are simultaneously present. The root nodes 150, 151, . . . 152 represent the current versions of all of the physical facilities represented in the data base. In total, these nodes 150, . . . 152 represent the root or time $T_o$ version of the data base. The transactions representing the service orders are grouped into transaction sets 153, 154, . . . 155, which are that set of changes necessary to carry out the corresponding ($T_1$, $T_2$ . . . $T_j$) date-dependent service orders. As before, a replication is created for each node affected by each transaction set. Thus node 150 is replicated as node 156 for transaction 153 and is replicated as node 157 for transaction set 155. Similarly, node 151 is replicated as nodes 158 and 159 for transaction sets 153 and 154, respectively, and node 152 is replicated as nodes 160 and 161 for transaction sets 154 and 155, respectively. The number of replications of each of root nodes 150 . . . 152 is exactly equal to the number of transactions 153 . . . 155 which affect that node. The number and identify of those nodes affected by any particular transaction set can be entirely arbitrary and, indeed, is fully determined by the physical changes which will be necessary to execute the work order associated with that transaction.

Up to this point, the representation of FIG. 12 corresponds exactly to the representation of FIG. 10. Each physical entity node is replicated for each service order having transactions affecting that node. Numerous versions of each node can exist simultaneously, differentiated by the transactions associated therewith. The complete set for any version of the data base comprises the set of replicated nodes for the corresponding transaction (the rows in FIG. 12) plus the most immediately above nodes for those nodes not replicated at the transaction set row level. Since the transactions correspond to time-stamped pending conditions, this set of nodes is the time stamped pending version of the data base. Accesses can be made to this set as a consistent set which accurately represents what the physical facilities will look like at the time identified by the appropriate transaction.

Rather than creating delta nodes, however, all of the information necessary to unambiguously identify any particular pending version of the data base is contained in two lists which can be called the transaction set list and the history tree list for each node. The transaction sets, of course, correspond to boxes 153 . . . 155 of FIG. 12. They each identify that set of nodes affected by each transaction. Thus, transaction 153 identifies (points to) nodes 156 and 158; transaction set 154 identifies nodes 159 and 160; and transaction set 155 identifies nodes 157 and 158. It can be seen that the transaction set list is no more than a sequence of pointers to those replicated nodes affected by that particular set of transactions.

The history tree lists, on the other hand, are merely directed pointer lists linking each of the root nodes 150 . . . 152 with all of the existing pending replications of that same node. Thus, a history tree links node 150 with nodes 156 and 157; a history tree links node 151 with nodes 158 and 159; and a history tree links node 152 with nodes 160 and 161. It can be seen that these history trees can also be nothing more than a list of pointers to the actual node versions, arranged in historical order.

Introducing a new transaction (new pending service order) merely involves using the $T_{i-1}$ transaction to identify the proper version of the affected nodes. If the node to be replicated is not on the transaction list for the next preceding ($T_{i-1}$) transaction, the history tree for that node can be entered and traced to find the then appropriate node version, i.e., the next higher node version on the history tree list. This next higher version might well be the root version (if no transaction affecting that node has as yet been specified), in which case the root version is used in carrying out the new transaction. A new transaction ($T_i$) is created and inserted in the list between the $T_{i-1}$ and $T_{i+1}$ portions of the list. Since linked list processing is well-known, these techniques can be readily applied to rapidly access the required nodes.

It is to be understood that the present invention has been illustrated in connection with assignments of telephone outside plant facilities for purposes of example only. This same technique could also be applied to almost any other facility inventory and assignment system by defining the appropriate node structures and transaction sets. Computer center facilities assignments, uses of raw materials, elements or subassemblies in varied manufacturing processes, chemical process planning, economic planning, and a myriad of other applications are readily apparent.

What is claimed is:

1. An electronic data base system comprising a plurality of data records, at least some of said records including pointers to a plurality of others of said records, means for selectively accessing each of said data records, means for representing a plurality of time-dependent versions of each of said data records, said time-dependent versions comprising a single version of said data base and the incremental changes to said current version, and means, utilizing said accessing means and responsive to said time-dependent record versions, for making transactions against a consistent, time-dependent version of said data base representing the state of physical entitities at some future time.

2. The data base system according to claim 1 wherein said representing means further includes means for generating at least one delta record for representing the relationship between a prior unchanged version of one of said data records and a subsequent changed version of the same data record.

3. The data base system according to claim 1 further comprising means for maintaining a list of identifications of those data records affected by said transactions, means for maintaining a list of data record versions of the same transaction, and means, utilizing said lists to identify said consistent, time-dependent versions of said data base.

4. The data base system according to claim 1 wherein said data records represent physical facilities to be assigned over time to a plurality of users, and said transactions comprises the creation, modification or deletion of assignments of said physical facilities.

5. The data base system according to claim 4 wherein said physical facilities comprise equipment utilized to provide telephone service to telephone subscribers.

6. The data base system according to claim 1 wherein each said data record comprises a body portion identifying the nature and attributes of the physical entity represented by that data record, and a plurality of edge portions identifying other data records and their specific relationship to the said data record.

7. The method of assigning physical facilities to a plurality of users for future use comprising the steps of
(1) creating a current version of a data base including a record to represent each of said physical facilities and the current assignments to each of said physical facilities to said users, at least some of said records thereby including pointers to a plurality of others of said records representing a particular one of said current assignments,
(2) for each new request for future assignment of facilities to one of said users,
  (a) generating a future version of those records in said data base affected by the future assignment of the represented facility to said one user,
  (b) maintaining a record of each fully consistent set of said data records corresponding to each of a plurality of future times,
  (c) making future assignments of said facilities by utilizing the appropriate one of said fully consistent sets, and repeating step (2) for all requests received prior to but due for execution subsequent to said new request.

8. The method of claim 7 wherein said step of maintaining fully consistent sets of data records further comprises the step of
(4) creating separate records in said data base identifying the data record version before each said future assignment and the data record version after each said future assignment.

9. The method of claim 7 wherein said step of maintaining fully consistent sets of data records further comprises the steps of
(4) creating separate lists of identifications of all versions of each data record, and
(5) creating a list of all data records affected by each said future assignment.

10. The method according to claim 7 wherein said steps of creating a current version or generating a future version further comprises the steps of
(4) creating a head portion of said data record including the identification and attributes of the physical facility therein represented, and
(5) creating a plurality of edge portions of said data record including the identification of related records and the attributes of the relationships with said related record.

* * * * *